(12) United States Patent
Sakakibara et al.

(10) Patent No.: US 7,717,392 B2
(45) Date of Patent: May 18, 2010

(54) SLIDE RAIL UNIT (75) Inventors: Yoshihiro Sakakibara, Iwakura (JP); Mitsunao Koumura, Motosu (JP)

(73) Assignee: Kabushiki Kaisha Imasen Denki Seisakusho, Inuyama (JP)

( * ) Notice: Subject to any disclaimer, the term of this patent is extended or adjusted under 35 U.S.C. 154(b) by 20 days.

(21) Appl. No.: 12/020,577

(22) Filed: Jan. 28, 2008

(65) Prior Publication Data
US 2008/0231101 A1 Sep. 25, 2008

(30) Foreign Application Priority Data
Jan. 30, 2007 (JP) ............................ 2007-019386

(51) Int. Cl.
*B60N 2/02* (2006.01)

(52) U.S. Cl. ................ 248/429; 248/430; 248/424; 297/344.1; 297/473

(58) Field of Classification Search ............... 248/429
See application file for complete search history.

(56) References Cited

U.S. PATENT DOCUMENTS 5,829,728 A * 11/1998 Hoshihara et al. ........... 248/429
6,109,584 A * 8/2000 Garrido ..................... 248/429
6,286,799 B1 * 9/2001 Fujii ......................... 248/430
6,305,746 B1 * 10/2001 Ikegaya et al. ........... 297/344.1
6,349,914 B1 * 2/2002 Yoshida et al. .............. 248/429

FOREIGN PATENT DOCUMENTS

| JP | 3646356 B2 | 1/1997 |
| JP | 2005-263049 A | 9/2005 |
| JP | 2006-224912 A | 8/2006 |
| JP | 2006-224913 A | 8/2006 |

* cited by examiner

*Primary Examiner*—J. Allen Shriver, II
*Assistant Examiner*—Alaeddin Mohseni
(74) *Attorney, Agent, or Firm*—Hiroe & Associates; Taras P. Bemko (57) ABSTRACT

A simple, compact and easy-to-assemble slide rail unit is provided. The slide rail unit reliably restrains right and left rails from sliding even when the right and left rails are installed onto the vehicle floor at an inclination angle different from each other in a longitudinal direction thereof. The slide rail unit includes a slide rail member having an upper rail member and an upper rail member slidably engaged with each other and a lock lever rotatably pivoted to the upper rail member so as to engage with/disengage from an engagement portion formed on the lower rail member. The slide rail unit also includes an operation lever connected to the lock lever within the slide rail member. Between the lock lever and the operation lever, a leaf spring member is disposed for connecting the lock lever and the operation lever therebetween.

6 Claims, 5 Drawing Sheets

SLIDE RAIL UNIT

FIELD OF THE INVENTION

The invention relates generally to slide rail units provided with lock mechanisms disposed within the right and left rail units for adjusting and fixing seat position of a vehicle in a front-rear direction thereof, particularly to a slide rail unit provided with an operation lever for simultaneously operating the right and left lock mechanisms.

DESCRIPTION OF THE RELATED ART

Conventionally, there have been proposed various kinds of slide rail units provided with lock mechanisms within right and left rails and an operation lever bridged therebetween with which the lock mechanisms can be operated simultaneously. When such slide rail units arranged as described above is installed onto a flat vehicle floor, each of the right and left rails can be restrained from sliding, and the position of the vehicle seat can be secured in a front-rear direction.

However, there is a possibility that a small error may be generated during processing the component parts of the slide rail units, mounting the slide rail units onto a vehicle seat and/or attaching the vehicle seat to the vehicle floor. When such error is generated, each of the right and left rails may be installed at an inclination angle different from each other. Under such circumstances, if the right and left rails are installed at an inclination angle different from each other with respect to a longitudinal direction thereof, one end of the operation lever may give an unintended force to a lock mechanism on a rail resulting in an insufficient slide restraint on the rail. That is, if the slide restraint of either one of the right and left rails is insufficient, a state of so-called cantilever is generated. As a result, there may arise such a problem that slide rail units fail to exhibit desired design strength as a whole. Such problem of cantilever may occur when a vehicle mounted with the slide rail units collides. Because, when the floor of the vehicle is deformed due to the collision and the right and left rails are inclined at an angle different from each other with respect to the longitudinal direction thereof, an unintended force may be given to one of the rails. Slide rail units capable of solving such problems have been proposed as described below.

Slide rail units disclosed in Japanese Patent No. 3646356 include a lock lever (17) disposed between an upper rail (12) and a lower rail (11), and the lock lever (17) is connected to an operation lever (19) being interposed by a wire spring (22). In the slide rail units, when a passenger operates the operation lever (19) bridged between the rails, the slide restraint can be released. The wire spring (22) disposed between the operation lever (19) and the lock lever (17) absorbs installation error and an unintended force is prevented from being given to one of the lock levers (17) by the operation lever (19). Therefore, even when the right and left rails are installed to the vehicle floor at an inclination angle different from each other with respect to the longitudinal direction thereof, the right and left rails reliably perform the slide restraint.

However, in the slide rail unit disclosed in Japanese Patent No. 3646356, the lock lever (17) and the operation lever (19) are connected to each other within the rail. Therefore, the slide rail cannot be constructed in a compact size resulting in a large size of the slide rail unit itself. Consequently, to mount the slide rail units in a vehicle compartment having special restrictions, a particular consideration has to be paid about the disposition of other component parts. Even when the lock mechanism is disposed within the rail to reduce the size, since a torsion spring (18) has to be hooked to an elongated hole (17b), the assembling work thereof becomes extremely difficult due to the structure thereof. In an actual assembling process of the vehicle seat, generally the right and left rails, which are separately assembled, are supplied to the seat assembling process. In a state that the right and left rails are mounted onto the seat, the operation lever (19) is attached to the right and left rails in the last assembly stage. Therefore, if the position of the torsion spring (18) is changed (i.e., displaced) during the transportation of the rails, the operation lever (19) cannot be attached.

As for the problem of displacement of the spring, slide rail units disclosed in Japanese Patent Application Laid-Open Publication No. 2006-224912 and Japanese Patent Application Laid-Open Publication No. 2006-224913 may provide a solution. In the above slide rail units, a multi-bracket (40) is formed of a leaf spring, and a force-imparting support (44) is integrally formed with the bracket (40). Through an insertion opening (44d) formed in the force-imparting support (44), an operation handle (60) is inserted. In the above arrangement, since the force-imparting support (44) is fixed on the bracket (40), the position of the force-imparting support (44) is not displaced.

However, in the above slide rail, the force-imparting support (44) of a leaf spring has to be formed integrally with the multi-bracket (40). Also, the insertion opening (44d) for inserting the operation handle (60) has to be formed in the force-imparting support (44). Furthermore, the end portion of the operation handle (60) has to be engaged with (supported by) the force-imparting support (44) only. As a result, the slide rail unit itself becomes larger in size due to the structure thereof. Under such circumstances, the multi-bracket (40) and the operation handle (60) have to be connected to each other outside the rail. Consequently, it is difficult to provide the slide rail unit with a compact structure.

The inventor of this application has proposed a slide rail unit disclosed in Japanese Patent Application Laid-Open Publication No. 2005-263049. Right and left slide rail units (10) each having a generally square shape in cross section include lock mechanisms therein. An operation lever (6) is disposed between the rails, and end portions of the operation lever (6) are connected to the lock mechanisms and fixed thereto being interposed by a spring (21) respectively.

In the above slide rail unit, when a passenger operates the operation lever (6) bridged between the slide rail units (10), the slide restraint can be released. Also, the spring (21) disposed between the operation lever (6) and the lock mechanism absorbs the assembly error, thereby the lock mechanisms are prevented form unintended force given by the operation lever (6). Therefore, even when the right and left rails are installed onto the vehicle floor at an inclination angle different from each other with respect to the longitudinal direction thereof, the right and left rails reliably perform the slide restraint. Furthermore, the right and left slide rail units (10) are formed in a generally square shape in cross section, and the operation lever (6) is inserted into the slide rail units (10) through the end portions thereof. Thus, the slide rail unit itself can be arranged compactly in size. The slide rail unit disclosed in Japanese Patent Application Laid-Open Publication No. 2005-263049 provides advantages in these points.

However, in the above slide rail unit also, the spring (21) has to be attach to a base portion (15d) before attaching the lock lever (15) to the upper rail (11), or the spring (21) has to be attached to the base portion (15d) after attaching the lock lever (15) to the upper rail (11). Therefore, there is such a problem that the attaching work is difficult to carry out due to the structure. Furthermore, as described above, in accentual assembling process of the vehicle seat, generally, the right and left rails are supplied to the seat assembling process after being assembled separately. In the state that the right and left rails are attached to the seat, the operation lever (6) is attached thereto at the last stage. Therefore, when the position of the spring (21) is changed during the transportation of the rails, the operation lever (6) may be hardly attached to the rails. Furthermore, to attach the end portions of the operation lever (6) to the rails, while searching with feeling, each of the end portions of the operation lever (6) has to be positioned at a proper position in a space formed between the elastically deforming spring (21) and the base portion (15d) and inserted thereinto. Therefore, there is a problem that the assembly work of the slide rail unit is complicated.

DISCLOSURE OF THE INVENTION

Therefore, it is an object of the invention to provide a slide rail unit which is simple and compact in structure and easy to assemble and, even when right and left rails are installed to a vehicle floor at an inclination angle different from each other with respect to the longitudinal direction thereof, the right and left rails reliably perform the slide restraint.

In order to achieve the above object, the invention adopts the following means.

A first aspect of the invention is a slide rail unit, which includes: a slide rail member including a lower rail member having an upper opening, an upper rail member covering the upper opening, the lower rail member and the upper rail member being slidably engaged with each other in a longitudinal direction thereof, and a lock lever rotatably pivoted onto the upper rail member so as to engage with and disengage from an engagement portion formed on the lower rail member; and, an operation lever inserted from one end portion of the slide rail member and connected to the lock lever within the slide rail member, wherein a leaf spring member is disposed between the lock lever and the operation lever, the leaf spring member is formed with, in one end portion thereof, a first nip-holding portion that nips and holds the lock lever and a first engagement portion that engages with the lock lever, and the leaf spring member is formed with, in the other end portion thereof, a second nip-holding portion that nips and holds the operation lever and a second engagement portion that engages with the operation lever.

A second aspect of the invention is the slide rail unit of the first aspect of the invention, wherein the slide rail unit includes a pair of right and left slide rail members, both end portions of one operation lever inserted from one end portion of the slide rail members are connected to the lock lever in the respective slide rail members.

A third aspect of the invention is the slide rail unit of the first or second aspect of the invention, wherein the first nip-holding portion and the second nip-holding portion in the leaf spring member are formed in end portions of a base metal in a longitudinal direction thereof by bending the base metal constituting the leaf spring member in a generally S-like shape as viewed from the side, a first engagement portion and a second engagement portion in the leaf spring member are formed by cutting and bending a portion opposite to the first nip-holding portion or second nip-holding portion in the base metal constituting the leaf spring member toward the first nip-holding portion or second nip-holding portion.

A fourth aspect of the invention is the slide rail unit of the third aspect of the invention, wherein the leaf spring member has the identical configuration in the end portion to be connected to the lock lever and in the end portion to be connected to the operation lever.

A fifth aspect of the invention is the slide rail unit of any one of the first to fourth aspect of the invention, wherein either one or both of the operation lever and the lock lever are formed with a projection that causes the operation lever and the lock lever to engage with each other when a passenger operates the operation lever at least in a direction to release the slide restraint.

A sixth aspect of the invention is the slide rail unit of the fifth aspect of the invention, wherein the operation lever is formed with a through hole and the through hole is inserted with a shaft capable of engaging with the lock lever.

A seventh aspect of the invention is the slide rail unit of the fifth aspect of the invention, wherein peripheral face of the operation lever is plastically deformed to form a projection capable of engaging with the lock lever.

A eighth aspect of the invention is the slide rail unit of the fifth aspect of the invention, wherein an end portion of the lock lever at the side to be connected with the operation lever is plastically deformed to form a projection capable of engaging with the lock lever.

The invention obtains the following effects:

In the slide rail unit of the first aspect of the invention, the slide rail member having a generally square shape in cross section includes the lower rail member and the upper rail member. The upper rail member covers the upper opening of the lower rail member. The operation lever inserted from an end opening of the slide rail member is connected to the lock lever within the slide rail member. Consequently, the slide rail unit itself is arranged in a compact size.

Further, in the slide rail unit of the first aspect of the invention, the leaf spring member disposed between the operation lever and the lock lever includes the first nip-holding portion and the second nip-holding portion as well as the first engagement portion and the second engagement portion. The first nip-holding portion and the first engagement portion are connected to the lock lever. The first nip-holding portion holds the end portion of the lock lever, and the first engagement portion engages therewith in an anti-disengagement manner. On the other hand, the second nip-holding portion and the second engagement portion are connected to the operation lever. The second nip-holding portion holds the end portion of the operation lever, and the second engagement portion engages therewith in an anti-disengagement manner. That is, the leaf spring member is connected to the lock lever and the operation lever through a process of hold and engagement. Therefore, so-called one-touch connection is achieved, and also the displacement is reliably prevented after the connection. Therefore, in the slide rail unit of the first aspect of the invention, after connecting one end of the leaf spring member to the lock lever (or operation lever), only by push the other end of the leaf spring member onto the operation lever (or lock lever), the connecting is reliably completed. Consequently, the assembly work of the slide rail unit is facilitated resulted in an increase of the productivity and a reduction of the manufacturing cost.

In the slide rail unit of the second aspect of the invention includes the pair (right and left) of slide rail members. Both end portions of the operation lever, which are inserted from one end portion of the slide rail members, are connected to the lock levers within the slide rail members. Between the operation lever and the respective lock levers, the leaf spring members are disposed, and the leaf spring member imparts a force to the operation lever and the lock lever in a direction to pull the both closer to each other. Therefore, when a load is applied to the operation lever in a direction opposite to the force imparted by the leaf spring member, a force acts on the operation lever to pull back the same toward the lock lever.

Therefore, when the pair (right and left) of slide rail members including therein the lock levers connected to the operation lever as described above is installed to a vehicle floor at an inclination angle different from each other with respect to the longitudinal direction thereof, the operation lever tends to part away from the lock lever against the force imparted by the leaf spring member. However, the leaf spring member pulls the operation lever and the lock lever in a direction closer to each other, and thus the connection therebetween is maintained. Therefore, according to the invention of the second aspect, the operation lever and the lock lever are permitted to part away a little from each other while maintaining the state that both are held close to each other. Therefore, even when an error is generated in installation angle between the right and left slide rail members, the error can be absorbed. Therefore, since an unintended force is prevented from being given to one or both of the slide rail members by the operation lever, slide restraint can be reliably achieved with the right and left seat rail members. It should be noted that, according to the second aspect of the invention, an error of installation angle due to deformation of the floor generated at vehicle collision can be also absorbed, and thus the slide restraint can be reliably achieved.

In the slide rail unit of the third aspect of the invention, the leaf spring member is formed in a generally S-like shape as viewed from the side by bending the base metal constituting the leaf spring member. The leaf spring member has the first nip-holding portion and the first engagement portion at one end portion thereof and second nip-holding portion and the second engagement portion at the other end portion thereof. The first nip-holding portion and the second nip-holding portion here are formed by bending both end portions of the base metal constituting the leaf spring member in a longitudinal direction thereof. By bending the base metal so that the distance between the bent faces is smaller than the thickness of the lock lever or operation lever to be connected, the connected lock lever or operation lever can be strongly pressed and reliably held thereby. The first engagement portion and the second engagement portion are formed by cutting the base metal at a position opposite to the first nip-holding portion or second nip-holding portion and bending up the same. The cut and bent-up portion engages with the lock lever or operation lever.

Therefore, according to the third aspect of the invention, the lock lever is supported at two points by the first nip-holding portion and the first engagement portion. On the other hand, the operation lever is supported at two points by the second nip-holding portion and the second engagement portion. Consequently, the leaf spring member can be connected strongly and stably to the lock lever and the operation lever. Further, according to the third aspect of the invention, since the structure is simple, the leaf spring member can be manufactured easily, and the risk of failure of the slide rail unit can be reduced.

Furthermore, in the leaf spring member according to the fourth aspect of the invention, both of the end portions to be connected to the lock lever or the operation lever are formed in a configuration identical to each other. Either side of the leaf spring member can be connected to either of the lock lever and operation lever. Therefore, the slide rail unit can be manufactured more easily resulting in an increase of the productivity moreover.

According to the fifth to eighth aspects of the invention, either one or both of the operation lever and the lock lever are formed with a projection that causes the operation lever and the lock lever to engage with each other. Therefore, when a passenger operates the operation lever at least in a direction to release the slide restraint, the operation lever and the lock lever come into contact with the projection and the leaf spring member at two points. Thus, utilizing the principle of leverage, the lock lever can be reliably rotated in the direction to release the slide restraint.

DESCRIPTION OF THE PREFERRED EMBODIMENTS

Figure 1:
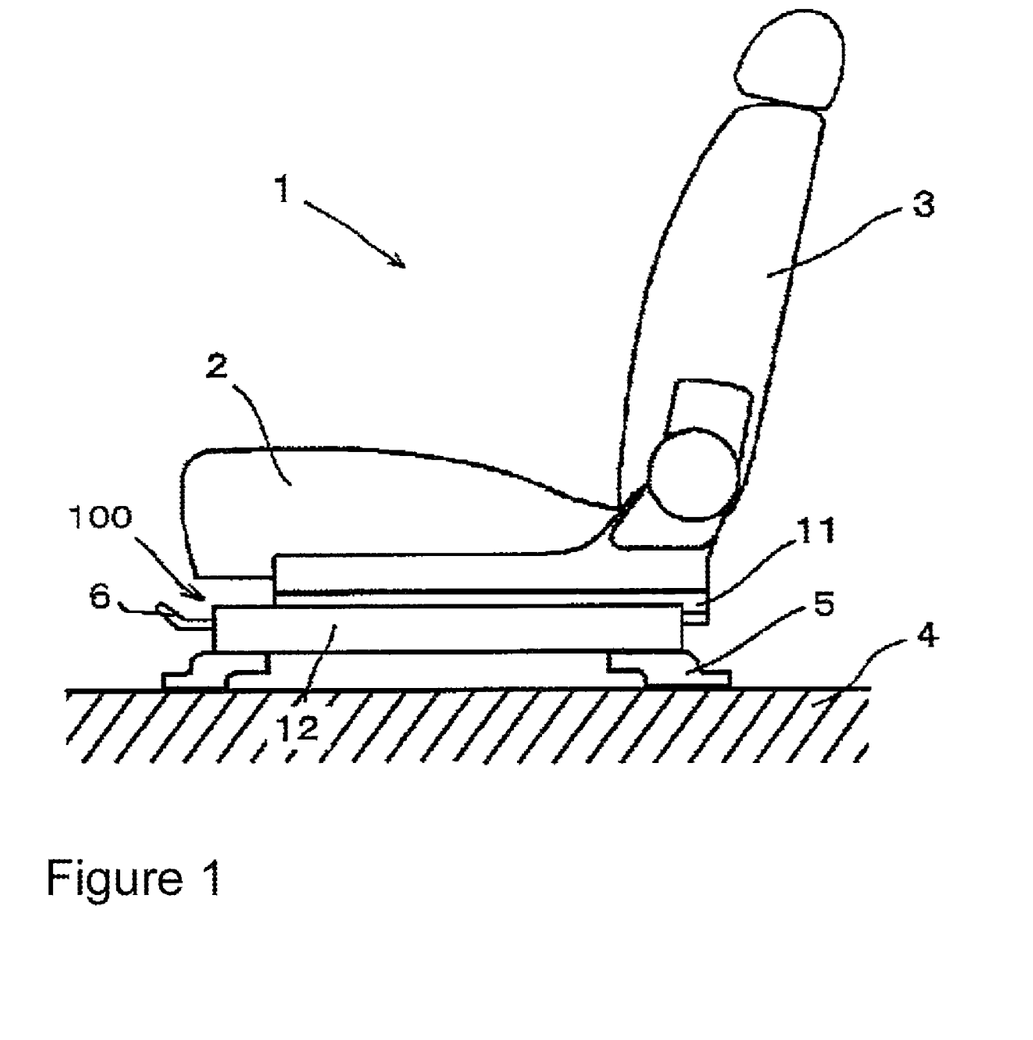
FIG. 1 is a side view illustrating an entire structure of a vehicle seat 1 on which a slide rail unit 100 according to the invention is mounted.

Preferred embodiments of the invention will be described below with reference to the accompanying FIGS. 1 to 7. A slide rail unit 100 according to the invention includes a pair of (right and left) slide rail members 10 each having a lower rail member 12, an upper rail member 11 and a lock lever 15 as illustrated in FIG. 1. Both end portions of one operation lever 6 are connected to the lock levers 15 in the right and left slide rail members 10 being interposed by a leaf spring member 21 respectively.

The lower rail member 12 is engaged with the upper rail member 11 slidably relative to each other in a longitudinal direction, and is fixed to the vehicle floor as illustrated in FIGS. 1 to 4. The lower rail member 12 is formed in a generally U-like shape in cross section having an upper opening 12g. The upper rail member 11 is coupled with the upper opening 12g and is covered to form a generally square shape in cross section. Further, the lower rail member 12 has an engagement portion capable of being engaged with the lock lever 15 and disengaged therefrom. The lock lever 15 is for restraining the upper rail member 11 from sliding and releasing the same. The lower rail member 12 according to the invention may be formed by pressing a steel plate into a generally U-like shape in cross section having the upper opening 12g. If engagement with the lock lever 15 and disengagement therefrom are possible, the configuration and structure of the engagement portion are not particularly specified. To be more precise, the lower rail member 12 may be formed with holes continuously formed at regular intervals along a bottom face in a longitudinal direction; or on the steel plates at the edge portions of the upper opening 12g, a configuration of saw teeth may be formed along the longitudinal direction thereof.

The upper rail member 11 is slidably engaged with the lower rail member 12, and a seat cushion is mounted thereon as illustrated in FIGS. 1 to 4. According to the invention, configuration and structure of the upper rail member 11 is not particularly specified, if the following requirements are satisfied. That is, the upper rail member 11 can be slidably engaged with the lower rail member 12; the upper opening 12g of the lower rail member 12 can be covered thereby; and the lock lever 15 can be mounted thereon.

Figure 2:
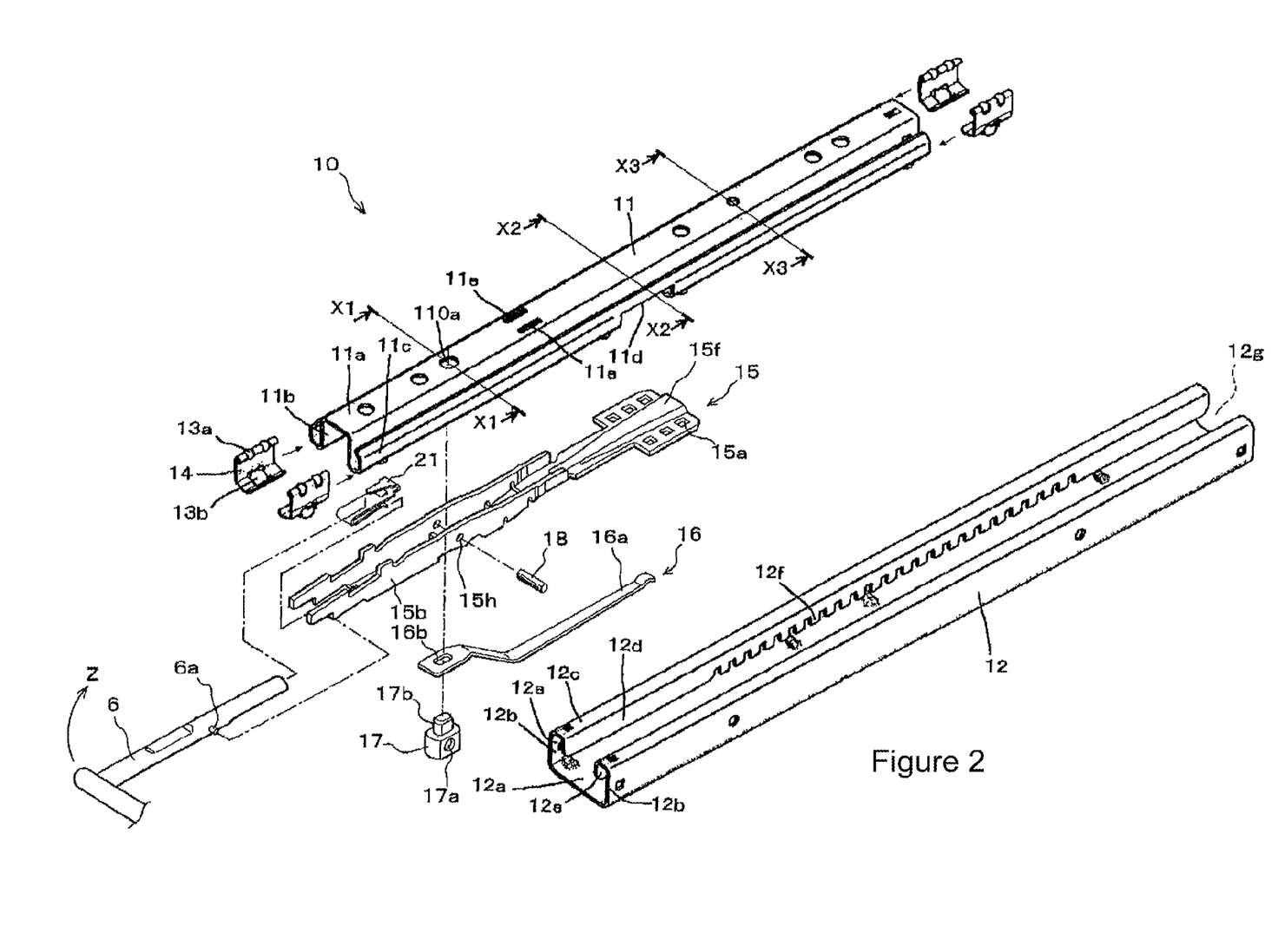
FIG. 2 is an exploded schematic view illustrating the slide rail unit 100 according to Embodiment 1.
Figure 5A:
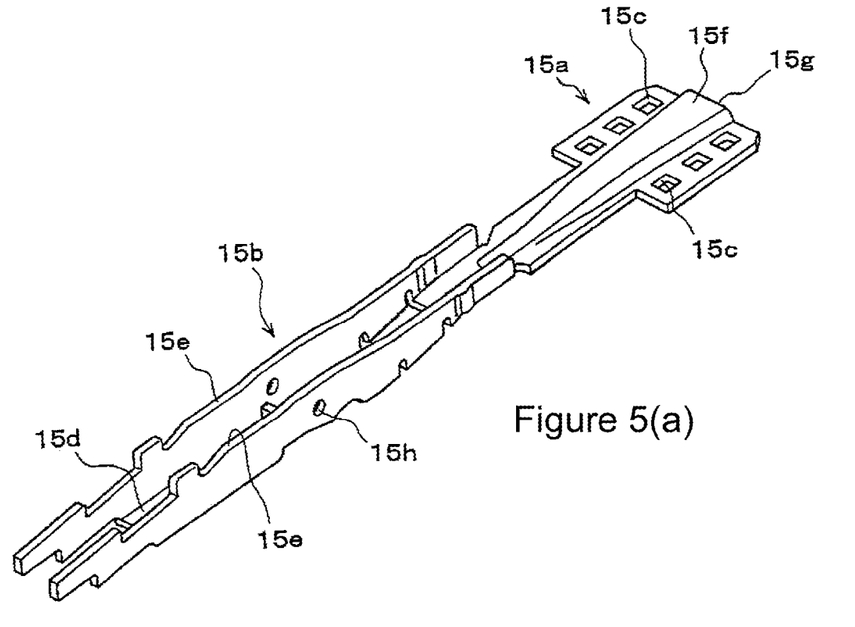
FIG. 5A is a perspective view illustrating detailed structure of a lock lever 15 shown in FIG. 2.

The lock lever 15 is connected to the operation lever 6 being interposed by the leaf spring member 21 at one end thereof. The lock lever 15 is attached to the upper rail member 11 in a manner of "seesaw structure" (rotatably supported on a shaft) as illustrated in FIG. 2. When a passenger operates the lock lever 15 to restrain the upper rail member 11 from sliding, the lock lever 15 is engaged with the engagement portion in the lower rail member 12. And when a passenger operates the lock lever 15 to release the lock lever 15 from the restraint, the lock lever 15 is disengaged from the engagement portion in the lower rail member 12. According to the invention, configuration and structure of the lock lever 15 are not particularly specified. The configuration and structure of the lock lever 15 may be desirably determined in accordance with the configuration and structure of the engagement portion in the lower rail member 12. To be more precise, the engagement portion may be arranged as a continuous hole continuously formed at regular intervals along the bottom face of the lower rail member 12 in the longitudinal direction thereof. In this case, engagement catches to be inserted into the continuous holes may be provided at one end of the lock lever 15. The other end of the lock lever 15 may be formed with a hole for receiving an end portion of the leaf spring member 21. On the other hand, the engagement portion may be arranged as saw teeth formed on edge steel plates of the lower rail member 12 along the upper opening 12g. In this case, the lock lever 15 may be formed with an engagement holes 15c to be engaged with the saw teeth in one end portion thereof as illustrated in FIG. 5A. And the other end of the lock lever 15 may be formed in a generally U-like shape in cross section so as to receive the leaf spring member 21 and the operation lever 6.

The operation lever 6 is inserted into right and left slide rail members 10 from one end portion thereof as illustrated in FIG. 1 and FIG. 2. The operation lever 6 is connected to the lock levers 15 located within both slide rail members 10. The operation lever 6 is for permitting a passenger to operate both lock levers 15 simultaneously. According to the invention, if the both ends of the operation lever 6 can be inserted from one ends of the right and left slide rail members 10 and is capable of being connected to the respective leaf spring members 21 within the slide rail members 10, the configuration and structure thereof is not particularly specified.

Figure 5B:
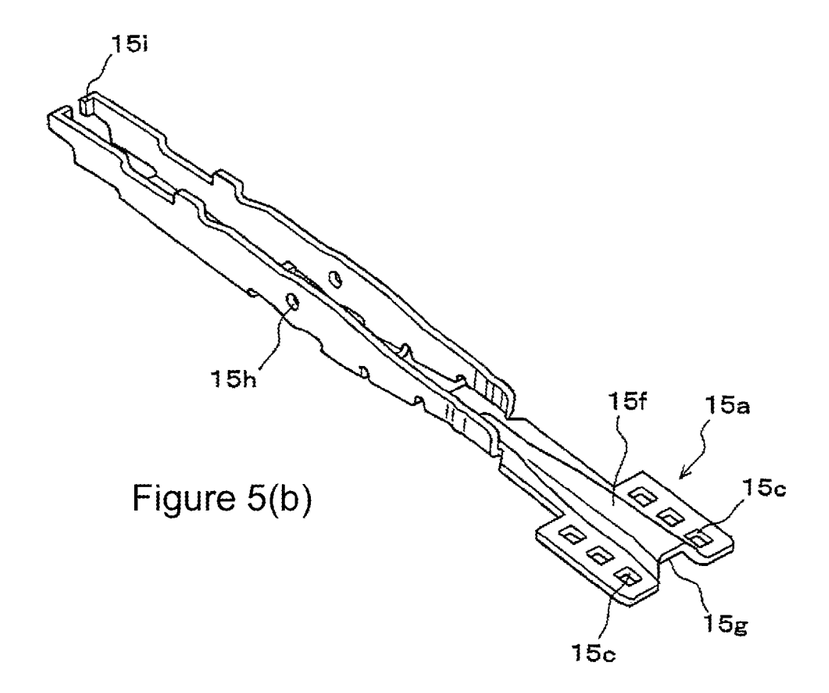
FIG. 5B is a perspective view illustrating detailed structure of a lock lever 15 according to another embodiment.
Figure 7:
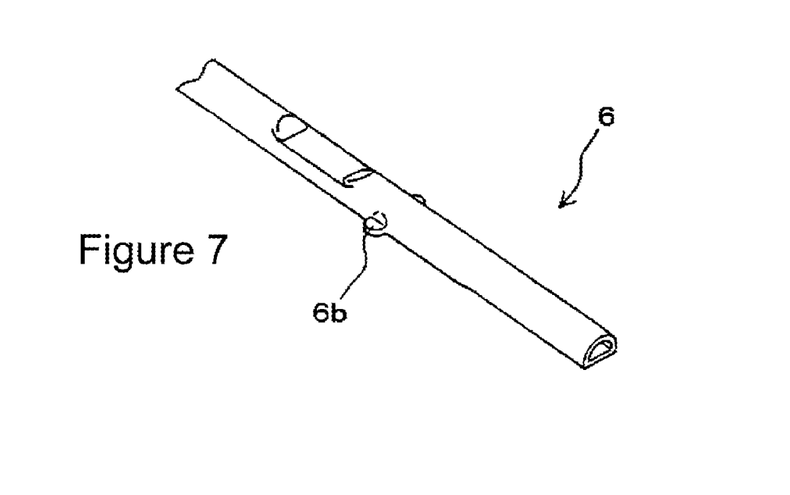
FIG. 7 is a partial perspective view illustrating detailed structure of an operation lever 6 according to another embodiment.

Either or both of the lock lever 15 and the operation lever 6 may be formed with a projection thereon. The projection causes the operation lever 6 and the lock lever 15 to engage with each other when a passenger operates the operation lever 6, at least, in a direction the slide rail members 10 are released from the restraint. To be more precise, any of the following manners may be adopted. That is, a through hole may be formed on the operation lever 6 and a shaft 6a may be inserted thereinto so as to engage with the lock lever 15 as illustrated in FIG. 2; a projection 15i may be plastically formed on one end of the lock lever 15 so that the projection 15i engages with the operation lever 6 as illustrated in FIG. 5B; or a projection 6b may be plastically formed on the peripheral face of the operation lever 6 so that the projection 6b engages with the lock lever 15 as illustrated in FIG. 7.

Figure 6A:
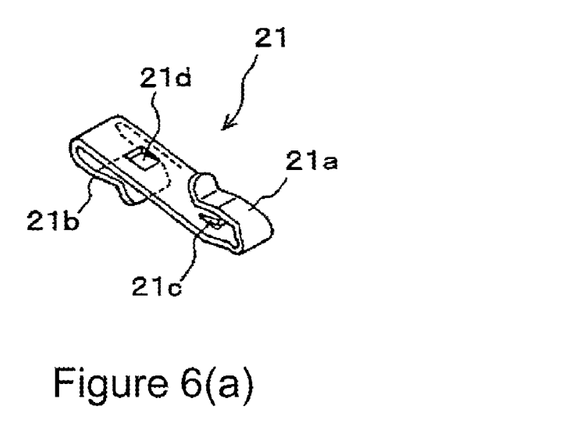
FIG. 6A is a perspective view illustrating detailed structure of a leaf spring member 21 shown in FIG. 2.
Figure 6B:
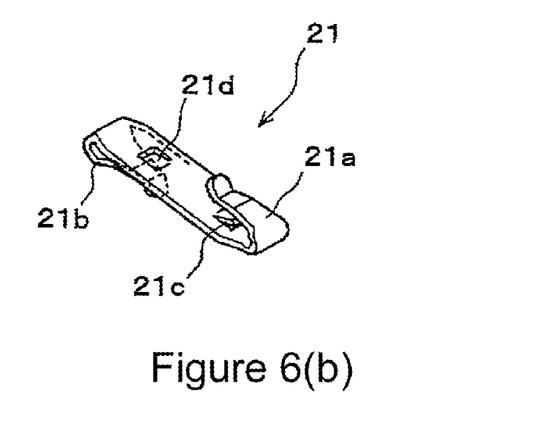
FIG. 6B is a perspective view illustrating detailed structure of a leaf spring member 21 according to another embodiment.

The leaf spring member 21 is disposed between the lock lever 15 and the operation lever 6 as illustrated in FIGS. 2, 6A and 6B. The leaf spring member 21 has a first nip-holding portion 21a that nips and holds the lock lever 15 and a first engagement portion 21c that engages with the lock lever 15 at one end portion thereof. Also, the leaf spring member 21 has a second nip-holding portion 21b that nips and holds the operation lever 6 and a second engagement portion 21d that engages with the operation lever 6 at the other end portion thereof. According to the invention, if the leaf spring member 21 is capable of connecting the lock lever 15 and the operation lever 6 therebetween, the configuration and structure thereof is not particularly specified. However, it is preferred to bend a base metal constituting the leaf spring member 21 into a generally S-like shape as viewed from the side. And the first nip-holding portion 21a and the first engagement portion 21c may be formed at one end portion thereof, and the second nip-holding portion 21b and the second engagement portion 21d may formed at the other end portion thereof as illustrated in FIG. 6A. Thus, the leaf spring member 21 can be manufactured in a simple structure at a low cost. The first nip-holding portion 21a and the second nip-holding portion 21b here are formed by bending both end portions of the base metal constituting the leaf spring member 21 in the longitudinal direction thereof. It is preferred to bend the base metal to an extent that the distance between the faces of the bent base metal is smaller than a thickness of the end portion of the lock lever 15 or the operation lever 6 to be connected thereto. Thus, the first nip-holding portion 21a and the second nip-holding portion 21b can nip strongly and reliably hold the connected lock lever 15 or the operation lever 6. The first engagement portion 21c and the second engagement portion 21d are formed by cutting and bending up the base metal at a position opposite to the first nip-holding portion 21a or the second nip-holding portion 21b. It is particularly preferred to form both sides of the leaf spring member 21 in the identical shape as illustrated in FIG. 6B; thereby any of the lock lever 15 and the operation lever 6 can be connected to the end portion at any side. With this arrangement, the slid rail can be assembled efficiently.

Example

A particularly preferable example of the above-described embodiments will be described below.

Figure 3:
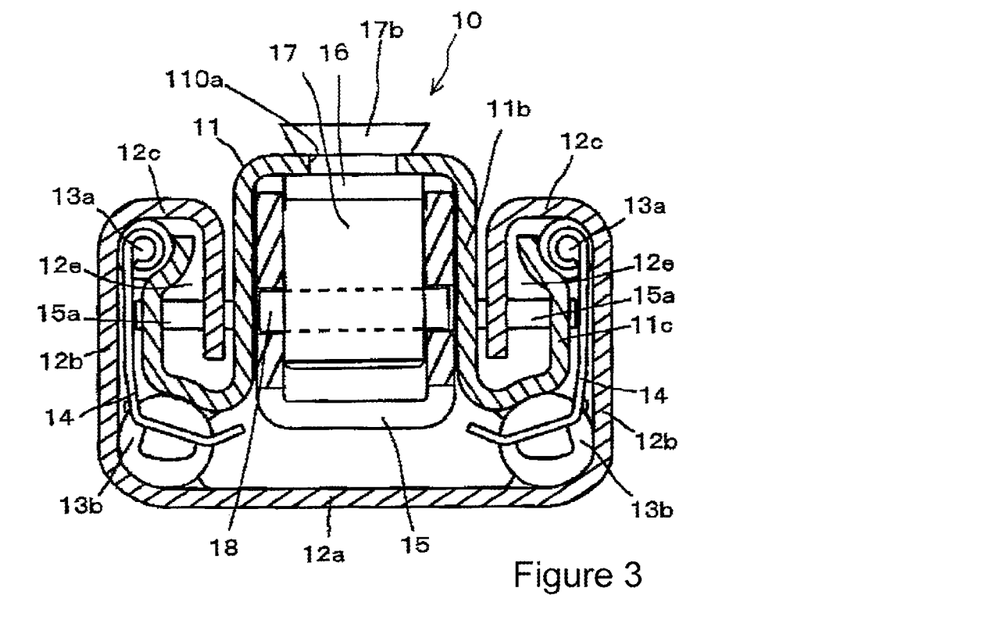
FIG. 3 is a cross sectional view of the slide rail unit 100 taken along a line X1-X1 in FIG. 2.
Figure 4:
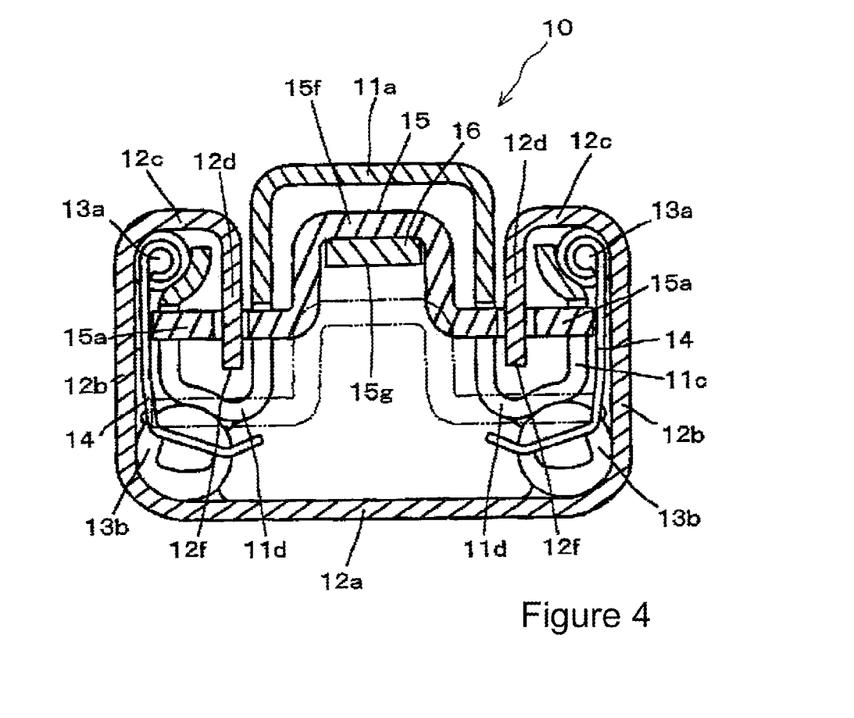
FIG. 4 is a cross sectional view of the slide rail unit 100 taken along a line X2-X2 in FIG. 2.

FIGS. 1 to 7 illustrate the slide rail unit 100 according to an example. FIG. 1 is a side view of the slide rail unit 100 according to the example. FIG. 2 is an exploded schematic view of the slide rail unit 100 according to the example. FIG. 3 and FIG. 4 are cross sectional views of the slide rail unit 100 according to the example. FIGS. 5 to 7 illustrate component parts of the slide rail unit 100 according to the example.

FIG. 1 is a side view illustrating entire structure of the vehicle seat 1 to which the slide rail unit 100 according to the example is attached. The vehicle seat 1 includes a seat cushion 2 and a seat back 3. Below the seat cushion 2, a pair (right and left) of slide rail members 10 is disposed. In FIG. 1, only one of the slide rail members 10 is illustrated.

On the upper faces of the upper rail members 11 of the slide rail members 10, the seat cushion 2 is fixed by known fastening means such as bolts or nuts. The lower rail members 12 are fixed onto a vehicle floor 4 being interposed by feet 5, 5 provided at the front and rear ends thereof. In FIG. 1, an operation lever 6 is disposed below the seat cushion 2 in a front area thereof. The operation lever 6 is arranged to operate a lock lever 15 within the slide rail members to thereby restrain the seat 1 from sliding in the front-rear direction and to release the seat 1 from the restraint.

Subsequently, referring to FIGS. 2 to 7, structure of the slide rail member 10 according to the example will be described in detail. The upper rail member 11 is formed of a metal plate such as iron. The upper rail member 11 is formed in a generally symmetrical inversed U-like shape in cross section through press and bending processes. The upper rail member 11 includes a plane base portion 11a, a pair (right and left) of vertical walls 11b, located at the both sides of the base 11a extended vertically downwardly, and a pair of flange portions 11c. Each of the flange portions 11c is formed on the respective vertical walls 11b that is bent outwardly and upwardly from the lower end thereof being swelled outwardly to form generally a L-like shape in cross section. The upper rail member 11 has a pair (right and left) of engagement portions 11d in a substantially central area thereof, in which the vertical walls 11b and the flange portions 11c are cut away as illustrated in FIG. 2.

The lower rail member 12 is formed of a metal plate such as iron. The lower rail member 12 is formed in a generally symmetrical U-like shape in cross section through press and bending processes. The lower rail member 12 includes a plane base portion 12a, a pair (right and left) of vertical walls 12b located at the both sides of the base portion 12a extended vertically upwardly, and a pair of flange portions 12d bent inwardly at an upper end portion 12c of the vertical wall 12b. The vertical walls 12b and the flange portions 12d are formed generally parallel to each other to form a groove portion 12e therebetween. In the front-end portions of the both side flange portions 12d extending downwardly, cutouts are formed at regular intervals to integrally form a plurality of lock teeth 12f (to be more definite, "saw teeth").

Furthermore, according to the example, as illustrated in FIG. 3 and FIG. 4, between the right and left flange portions 11 of the upper rail member 11 and the right and left groove portions 12e of the lower rail member 12, retainers 14 are disposed. Each of the retainers 14 includes steel balls 13a, 13b rotatably at the upper and lower sides thereof. The upper steel balls 13a are disposed rotatably in a space formed by the upper rail member 11 and the lower rail member 12. The space is formed at a corner portion formed by the vertical wall 12b and the upper end portion 12c of the lower rail member 12 and the upper-end outer portion of the flange portion 11c of the upper rail member 11. On the other hand, the lower steel ball 13b is disposed rotatably in a space formed by the upper rail member 11 and the lower rail member 12. The space is formed at a corner portion formed by the base portion 12a and the vertical wall 12b of the lower rail member 12 and the lower-end outer portion of the flange portion 11c of the upper rail member 11. Due to the rotation of the steel balls 13a, 13b, the upper rail member 11 slides smoothly in a longitudinal direction with respect to the lower rail member 12.

As described above, the upper rail member 11 and the lower rail member 12 are slidably engaged (coupled) with each other being interposed by the retainer 14. Consequently, the base portion 11a of the upper rail member 11 is disposed being opposed to the base portion 12a of the lower rail member 12. The pair (right and left) of the vertical walls 11b of the upper rail member 11 is disposed being opposed to the pair (right and left) of the vertical walls 12b of the lower rail member 12. And the flange portions 11c and 12d are disposed being opposed to each other. With this arrangement, the slide rail member 10 has generally a square shape in cross section in the full length thereof. By coupling the both square shape sections, the strength of the slide rail member 10 can be increased without increasing the thickness of the upper rail member 11 and the lower rail member 12.

A lock lever 15 is formed by pressing a metal plate such as iron as illustrated in FIG. 2. The lock lever is inserted into the engagement portion 11d formed in substantially central area of the upper rail member 11, and disposed so as to engage with/disengage from lock teeth 12f formed on the lower rail member 12; thus a lock mechanism is structured within the slide rail member 10. The lock lever 15 is formed integrally with an engagement portion 15a in one end portion thereof. The engagement portion 15a can be engaged with the lock teeth 12f formed on the lower rail member 12. In the other end portion of the lock lever 15, a mounting portion 15b, which is attached to the operation lever 6 being interposed by the leaf spring member 21, is formed. According to the example, the engagement portion 15a has a plate of a generally rectangular shape, and in the central portion thereof, a reinforcement rib 15f is formed. The rib 15f protrudes toward the base portion 11a of the upper rail member 11 (upwards) and extends in a longitudinal direction of the slide rail unit. In the both sides of the rib 15f, a plurality (in the example, three) of lock holes 15c is formed respectively. On the other hand, the end portion of the mounting portion 15b is inserted and fixed to the end portion of the operation lever 6 being interposed by the leaf spring member 21.

Since the rib 15f protrudes toward the base portion 11a of the upper rail member 11, even when the engagement portion 15a comes to a position indicated with a virtual line in FIG. 4 accompanying the operation of releasing the slide restraint, the rib 15f is prevented from coming into contact with the base portion 12a of the lower rail member 12. Therefore, the rib 15f does not interfere with the operation of the engagement portion 15a and sliding movement of the upper rail member 11.

FIG. 5A is a perspective view illustrating the lock lever 15. Substantially full length of the lock lever 15 is formed as a mounting portion 15b excluding the engagement portion 15a. The lock lever 15 is formed in a generally U-like shape in cross section with a plane base portion 15d and vertical walls 15e formed at the both sides thereof. The right and left vertical walls 15e are formed with a shaft hole 15h in a substantially central area thereof.

The mounting portion 15b having a generally U-like shape in cross section including the base portion 15d and vertical walls 15e formed at the both sides thereof is formed in the following dimensions. That is, the mounting portion 15b is engaged with the base portion 11a of the upper rail member 11 opposed to each other being interposed by a small space inside the generally inversed U-like shape formed by the right and left vertical walls 11b. Therefore, the completed slide rail member 10 has a generally square configuration in cross section, which is formed by the base portion 11a and the right and left vertical walls 11b of the upper rail member 11 and the base portion 15d and the right and left vertical walls 15e of the mounting portion 15, in a portion where the vertical walls 15e of the lock lever 15 extend; i.e., a portion adjacent to the front end of the slide rail member 10 as illustrated in FIG. 3. Furthermore, the outer side of the completed slide rail member 10 has a generally square configuration in cross section formed by the upper rail member 11 and the lower rail member 12 same as the conventional. Therefore, the slide rail member 10 has generally double square configuration in cross section formed by the above combination structure in the portion adjacent to the front end thereof. Accordingly, the modulus of the section is largely increased resulting in an increased strength.

A rivet 17 has a generally O-like shape in cross section like a cylinder, the side face of which is cut away as illustrated in FIG. 2, and in the central area thereof a through hole 17a is formed. The rivet 17 is disposed within the U-like section of the mounting portion 15b formed in the lock lever 15. A spring pin 18 is inserted through the shaft hole 15h and the through hole 17a. Thus the lock lever 15 is attached to the rivet 17 so as to rotate on the spring pin 18. Further, the upper end portion 17b of the rivet 17 is secured in a rivet hole 110a, which has an O-like shape formed in the base portion 11a of the upper rail member 11, and fixed thereto. The width between the both sides of the rivet 17 is arranged to be identical to a distance between the right and left vertical walls 11b formed in the upper rail member 11 as illustrated in FIG. 3. Thus, the rivet 17 also increases the sectional strength of the upper rail member 11; i.e., the strength of the slide rail member 10.

A lock spring 16 is formed of a metal plate bent with a press as shown in FIG. 2. The lock spring 16 includes a push portion 16a and a fixing hole 16b. The push portion 16a pushes a concave portion 15g located at the rear face of the rib 15f of the lock lever 15 toward the base portion 11a of the upper rail member 11 (upward). The upper end portion 17b of the rivet 17 is inserted through the fixing hole 16b and fixed to the rivet hole 110a of the upper rail member 11, thus the lock lever 15 is rotatably supported by the upper rail member 11. The lock spring 16 constantly imparts a force to the engagement portion 15a of the lock lever 15 in a direction that the engagement portion 15a is being engaged with the engagement portion 11d of the upper rail member 11.

A leaf spring member 21 is formed of a metal plate bent through a bending process, which has a generally S-like shape as viewed from the side as illustrated in FIG. 2. The leaf spring member 21 has a first nip-holding portion 21a and a first engagement portion 21c in one end portion thereof; and a second nip-holding portion 21b and a second engagement portion 21d in the other end portion thereof. The first nip-holding portion 21a and the second nip-holding portion 21b here are formed of a base metal constituting the leaf spring member 21 by bending both end portions in a longitudinal direction thereof. The end portions are preferably bent so that the distance between the bent planes of the base metal is smaller than the thickness of the end portion of the lock lever 15 or operation lever 6 to be connected. With this arrangement, the connected lock lever 15 or operation lever 6 can be strongly nipped and reliably held by the nip-holding portion. Further, the first engagement portion 21c and the second engagement portion 21d are formed by cutting the base metal and bending the same up at a position opposite to the first nip-holding portion 21a or second nip-holding portion 21b. The cut and bent-up portions engage with concave portions (not shown) formed on the lock lever 15 and operation lever 6. Therefore, the leaf spring member 21 can be connected to the operation lever 6 and the lock lever 15 through a so-called one-touch operation. Therefore, when the lock lever 15 connected to the leaf spring member 21 is disposed in the slide rail member 10, only by pushing the operation lever 6 into the end portion of the slide rail member 10, the operation lever 6 can be connected to the leaf spring member 21 within the slide rail member 10 through one-touch operation. When the lock lever 15, which is not connected to the leaf spring member 21, is disposed within the slide rail member 10, the leaf spring member 21 is connected to the front end of the operation lever 6 first. The operation lever 6 is then just inserted from the end portion of the slide rail member 10, thereby the leaf spring member 21 located at the from end of the operation lever 6 can be connected to the lock lever 15 within the slide rail member 10 with one-touch operation. That is, by adopting the leaf spring member 21 according to the example, the lock lever 15 and the operation lever 6 can be connected to each other without searching for the lock lever 15 in the slide rail member 10. Therefore, the productivity is largely increased.

When the operation lever 6 is not operated, the lock spring 16 imparts a force to the engagement portion 15a of the lock lever 15 toward the base portion 11a of the upper rail member 11 (upward). Accordingly, the outer periphery of the engagement portion 15a is engaged with the engagement portion 11d of the upper rail member 11. The lock holes 15c formed in the engagement portion 15a engage with appropriate lock teeth 12f of the lower rail member 12, thereby the relative position of the upper rail member 11 and the lower rail member 12 is locked (restrained from sliding). That is, in the above state, the right and left slide rail members 10 are locked from sliding, and thus the front-rear position of the seat is held at a specific position.

In the above state, when the operation lever 6 is operated in a direction indicated with an arrow "Z" in FIG. 2, the lock lever 15 rotates on the spring pin 18. The engagement portion 15a of the lock lever 15 moves from a position indicated with a solid line to a position indicated with a virtual line in FIG. 4. Thus, the engagement between the engagement portion 15a and the engagement portion 11d of the upper rail member 11 is disengaged. At the same time, the engagement between the lock holes 15c formed in the engagement portion 15a and the lock teeth 12f of the lower rail member 12 is also disengaged. Consequently, the upper rail member 11 and the lower rail member 12 are allowed to adjust the relative position therebetween. That is, the lock of the right and left slide rail members 10 (restraint from sliding) is released, and thus the position of the seat can be adjusted in the front-rear direction. Further, after the position of the seat has been appropriately adjusted in the front-rear direction, when the operation lever 6 is released, the lock lever 15 is rotated on the spring pin 18 in the opposite direction by the force imparted by the lock spring 16. Thus, the slide rail members 10 are locked and reset to the initial state.

What is claimed is:

1. A slide rail unit, comprising:
    a slide rail member including a lower rail member having an upper opening, an upper rail member covering the upper opening, the lower rail member and the upper rail member being slidably engaged with each other in a longitudinal direction thereof, and a lock lever rotatably pivoted onto the upper rail member so as to engage with and disengage from an engagement portion formed on the lower rail member; and
    an operation lever inserted from one end portion of the slide rail member and connected to the lock lever within the slide rail member, wherein a leaf spring member is disposed between the lock lever and the operation lever, the leaf spring member is formed with, in one end portion thereof, a first nip-holding portion that nips and holds the lock lever and a first engagement portion that engages with the lock lever, and the leaf spring member is formed with, in the other end portion thereof, a second nip holding portion that nips and holds the operation lever and a second engagement portion that engages with the operation lever, and wherein the first nip-holding portion and the second nip-holding portion in the leaf spring member are formed in end portions of a base metal in a longitudinal direction thereof by bending the base metal constituting the leaf spring member in a generally S-like shape as viewed from the side, and wherein the first engagement portion and the second engagement portion in the leaf spring member are formed by cutting and bending a portion opposite to the first nip-holding portion or second nip-holding portion in the base metal constituting the leaf spring member toward the first nip-holding portion or second nip-holding portion.

2. The slide rail unit according to claim 1, wherein the slide rail unit includes a pair of right and left slide rail members, both end portions of one operation lever inserted from one end portion of the slide rail members are connected to the lock lever in the respective slide rail members.

3. The slide rail unit according to claim 1, wherein either one or both of the operation lever and the lock lever are formed with a projection that causes the operation lever and the lock lever to engage with each other when a passenger operates the operation lever at least in a direction to release the slide restraint.

4. The slide rail unit according to claim 3, wherein the operation lever is formed with a through hole and the through hole is inserted with a shaft capable of engaging with the lock lever.

5. A slide rail unit comprising:
  a slide rail member including a low rail member having an upper opening, an upper rail member covering the upper opening, the low rail member and the upper rail member being slidably engaged with each other in a longitudinal direction thereof, and a lock lever rotatably pivoted onto the upper rail member so as to engage with and disengage from an engagement portion formed on the low rail member; and
  an operation lever inserted from one end portion of the slide rail member and connected to the lock lever within the slide rail member, wherein a leaf spring member is disposed between the lock lever and the operation lever, the leaf spring member is formed with, in one end portion thereof, a first nip-holding portion that nips and holds the lock lever and a first engagement portion that engages with the lock lever, and the leaf spring member is formed with, in the other end portion thereof, a second nip holding portion that nips and holds the operation lever and a second engagement portion that engages with the operation lever, and wherein either one or both of the operation lever and the lock lever are formed with a projection that causes the operation lever and the lock lever to engage with each other when a passenger operates the operation lever at least in a direction to release the slide restraint.

6. The slide rail unit according to claim 5, wherein the operation lever is formed with a through hole and the through hole is inserted with a shaft capable of engaging with the lock lever.

* * * * *